United States Patent [19]
Linzer et al.

[11] Patent Number: 5,729,294
[45] Date of Patent: Mar. 17, 1998

[54] MOTION VIDEO COMPRESSION SYSTEM WITH NOVEL ADAPTIVE QUANTIZATION

[75] Inventors: Elliot Neil Linzer, Bronx; Heidi Aarlien Peterson, New York, both of N.Y.

[73] Assignee: International Business Machines Corporation, Armonk, N.Y.

[21] Appl. No.: 418,141

[22] Filed: Apr. 5, 1995

[51] Int. Cl.$^6$ .................................................. H04N 7/12
[52] U.S. Cl. .............................................. 348/405; 348/403
[58] Field of Search ................................ 348/405, 403, 348/402, 401, 400, 408, 409, 415, 419; H04N 7/12

[56] References Cited

U.S. PATENT DOCUMENTS

| | | | |
|---|---|---|---|
| 4,868,653 | 9/1989 | Golin et al. | 348/405 |
| 4,972,260 | 11/1990 | Fujikawa et al. | 348/405 |
| 5,051,840 | 9/1991 | Watanabe et al. | 358/433 |
| 5,249,053 | 9/1993 | Jain | 348/405 |
| 5,301,242 | 4/1994 | Gonzales et al. | 348/409 |
| 5,351,083 | 9/1994 | Tsukagoshi | 348/405 |
| 5,424,777 | 6/1995 | Koga et al. | 348/403 |
| 5,459,518 | 10/1995 | Wickstorm et al. | 348/405 |
| 5,521,717 | 5/1996 | Maeda | 348/408 |

FOREIGN PATENT DOCUMENTS

| | | | |
|---|---|---|---|
| A-0 444 918 A2 | 4/1991 | European Pat. Off. | H04N 1/41 |
| A-0 540 961 A2 | 12/1993 | European Pat. Off. | H04N 7/13 |

OTHER PUBLICATIONS

F. Lavagetto and R. Leonardi, "Block Adaptive Quantization of Multiple Frame Motion Field," Visual Communications and Image Processing '91: Visual Communication, SPIE vol. 1605, pp. 534–545 (1991).

E. Viscito and C. Gonzales, "A Video Compression Algorithm With Adaptive Bit Allocation and Quantization," Visual Communications and Image Processing '91: Visual Communication, SPIE vol. 1605, pp. 58–72 (1991).

H.A. Peterson, A.J. Ahumada, Jr., & A.B. Watson, "32.3: Visibility of DCT Quantization Noise: Spatial Frequency Summation," 1994 SID International Symposium Digest of Technical Papers, vol. 25, pp. 704–707 (Jun. 1994).

Primary Examiner—Tommy P. Chin
Assistant Examiner—Luanne Din
Attorney, Agent, or Firm—Heslin & Rothenberg, P.C.

[57] ABSTRACT

A system and method for coding a digitized picture is described. The picture is divided into a plurality of regions and then each region is further divided into a plurality of subregions. Linear combinations of pixels in each subregion are then computed. A subregional adaptive quantisation parameter for each of the subregions is then determined based on the courseness tolerance of that subregion as established by processing the linear combinations. A regional quantisation parameter for each region is then determined as a function of the subregional adaptive quantisation parameters and then a quantisation level for each of the regions is determined based on the regional quantisation parameter. Once the regional quantisation level for a region has been determined, it is transform encoded. The transform encoded representations of the regions are concatenated to obtain an encoded representation of the entire picture which can then be decoded for display or storage.

6 Claims, 11 Drawing Sheets

PRIOR ART

PRIOR ART

MOTION VIDEO COMPRESSION SYSTEM WITH NOVEL ADAPTIVE QUANTIZATION

I. BACKGROUND OF THE INVENTION a. Field of the Invention

The present invention relates to the field of data compression and, more particularly, to a system and techniques for compressing digital motion video signals.

b. Related Art

Technological advances in digital transmission networks, digital storage media, Very Large Scale Integration devices, and digital processing of video and audio signals are converging to make the transmission and storage of digital video economical in a wide variety of applications. Because the storage and transmission of digital video signals is central to many applications, and because an uncompressed representation of a video signal requires a large amount of storage, the use of digital video compression techniques is vital to this advancing art. In this regard, several international standards for the compression of digital video signals have emerged over the past decade, with more currently under development. These standards apply to algorithms for the transmission and storage of compressed digital video in a variety of applications, including: video-telephony and teleconferencing; high quality digital television transmission on coaxial and fiberoptic networks as well as broadcast terrestrially and over direct broadcast satellites; and in interactive multimedia products on CD-ROM, Digital Audio Tape, and Winchester disk drives.

Several of these standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 standards. The MPEG-2 standard has been developed by the Moving Picture Experts Group (MPEG), part of a joint technical committee of the International Standards Organization (ISO) and the International Electrotechnical Commission (IEC). The MPEG committee has been developing standards for the multiplexed, compressed representation of video and associated audio signals. The standards specify the syntax of the compressed bit stream and the method of decoding, but leave considerable latitude for design of the encoder.

One of the tasks performed by the encoder is to decide how well to represent various portions of each image (i.e. the quality of each portion after reconstruction by the decoder). This typically involves a trade off between a number of encoding considerations. For example, in MPEG-2 encoders, setting a quantiser parameter (QP) for each macroblock is the primary means by which the encoder trades off quality versus bit rate production. This is true both on the sequence level and on the macroblock level: if all of the values of QP in a sequence are increased or decreased, then the quality and bit rate of the sequence will be, respectively, increased or decreased. If QP is increased or decreased for a single MB, then the quality and number of bits used for that macroblock will be, respectively, increased or decreased.

Some regions of a picture will be more "sensitive" to quantisation noise than other regions. That is, the distortion caused by using a large value of QP will be more noticeable in some regions of the image than in others. Thus an encoder may try to use a large value of QP in regions of the picture where this will not cause severe perceptual degradation and smaller values for QP in regions of the picture that are more sensitive to quantisation noise. This process, known as adaptive quantisation, is not a subject of the MPEG standards. As a result, two encoders may use completely different techniques for adaptive quantisation and still each produce valid bit streams. However, the overall quality of the pictures decoded from the bit stream produced by an encoder will depend on the adaptive quantisation unit. Moreover, different adaptive quantisation may have different implementation costs.

A video encoder using adaptive quantisation is described in the patent U.S. Pat. No. 5,301,242 to Gonzales et al., entitled "Apparatus and Method for Motion Video encoding employing an Adaptive quantiser", which is incorporated by reference herein as if printed in full below.

Another example of a video encoder using adaptive quantisation is described in ISO-IEC/JTC1/SC29/WG11/NO-400, April 1993, entitled "Test Model 5". This adaptive quantisation technique is based on computing the variance of sub-blocks of each macroblock.

II. SUMMARY OF THE INVENTION

In view of the above, the present invention includes a system and method for encoding video data using a novel adaptive quantisation subsystem. In a preferred embodiment, each macroblock is divided into sub-blocks, which are each fed into block parameter generators. The block parameter generators compute a block adaptive quantisation parameter for each subblock, and from these parameters, a parameter coalescing unit computes a macroblock adaptive quantisation parameter. In particular, the block parameter generators compute linear combinations of the pixels in the input subblocks and then determine a block adaptive quantisation parameter from the linear combinations. The macroblock adaptive quantisation parameter is used by the encoder to determine the quantisation level for the macroblock.

III. BRIEF DESCRIPTION OF THE DRAWING

The invention will be better understood by reference to the drawing, wherein.

IV. DETAILED DESCRIPTION OF THE DRAWINGS AND PREFERRED EMBODIMENTS a. MPEG Environment

As the present invention may be applied in connection with an MPEG-2 encoder, in order to facilitate an understanding of the invention, some pertinent aspects of the MPEG-2 video compression standard will be reviewed. It is to be noted, however, that the invention can also be applied to other video coding algorithms which share some of the features of the MPEG-2 standard.

To begin with, it will be understood that the compression of any data object, such as a page of text, an image, a segment of speech, or a video sequence, can be thought of as a series of steps, including: 1) a decomposition of that object into a collection of tokens; 2) the representation of those tokens by binary strings which have minimal length in some sense; and 3) the concatenation of the strings in a well-defined order. Steps 2 and 3 are lossless, i.e., the original data is faithfully recoverable upon reversal, and Step 2 is known as entropy coding.

Step 1 can be either lossless or lossy in general. Most video compression algorithms are lossy because of stringent bit-rate requirements. A successful lossy compression algorithm eliminates redundant and irrelevant information, allowing relatively large errors where they are not likely to be visually significant and carefully representing aspects of a sequence to which the human observer is very sensitive. The techniques employed in the MPEG-2 standard for Step 1 can be described as predictive/interpolative motion-compensated hybrid DCT/DPCM coding. Huffman coding, also known as variable length coding, is used in Step 2. Although, as mentioned, the MPEG-2 standard is really a specification of the decoder and the compressed bit stream syntax, the following description of the MPEG-2 specification is, for ease of presentation, primarily from an encoder point of view.

The MPEG video standards specify a coded representation of video for transmission. The standards are designed to operate on interlaced or noninterlaced component video. Each picture has three components: luminance (Y), red color difference $C_r$, and blue color difference $C_b$. The $C_r$ and $C_b$ components each have half as many samples as the Y component in both horizontal and vertical directions.

An MPEG data stream consists of a video stream and an audio stream which are packed, together with systems information and possibly other bit streams, into a systems data stream that can be regarded as layered. Within the video layer of the MPEG data stream, the compressed data is further layered. A description of the organization of the layers will aid in understanding the invention.

Figure 1:
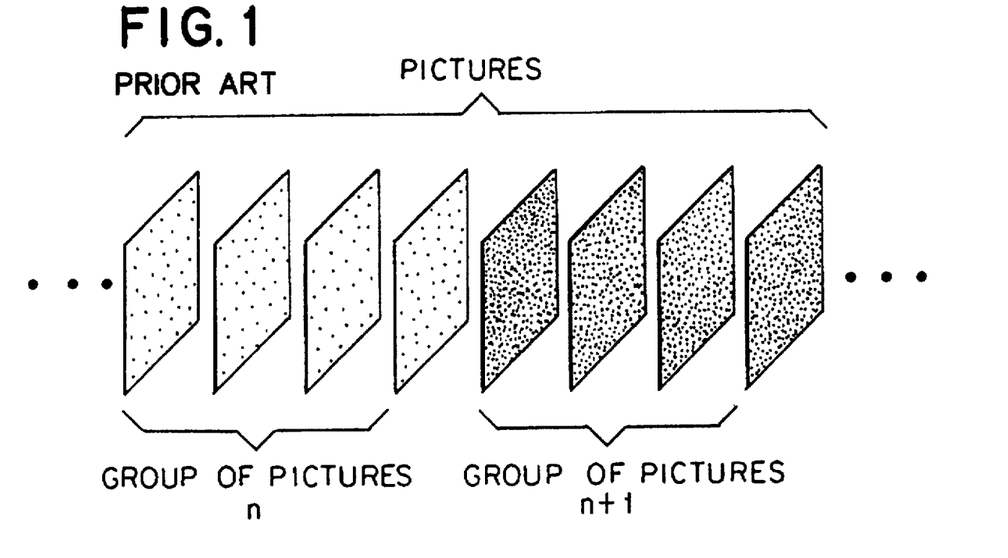
FIG. 1 shows an exemplary pair of Groups of Pictures (GOP's)

The layers pertain to the operation of the compression scheme as well as the composition of a compressed bit stream. The highest layer is the Video Sequence Layer, containing control information and parameters for the entire sequence. At the next layer, a sequence is subdivided into sets of consecutive pictures, each known as a Group of Pictures (GOP). A general illustration of this layer is shown in FIG. 1. Decoding may begin at the start of any GOP, essentially independent of the preceding GOP's. There is no limit to the number of pictures which may be in a GOP, nor do there have to be equal numbers of pictures in all GOP's.

Figure 2:
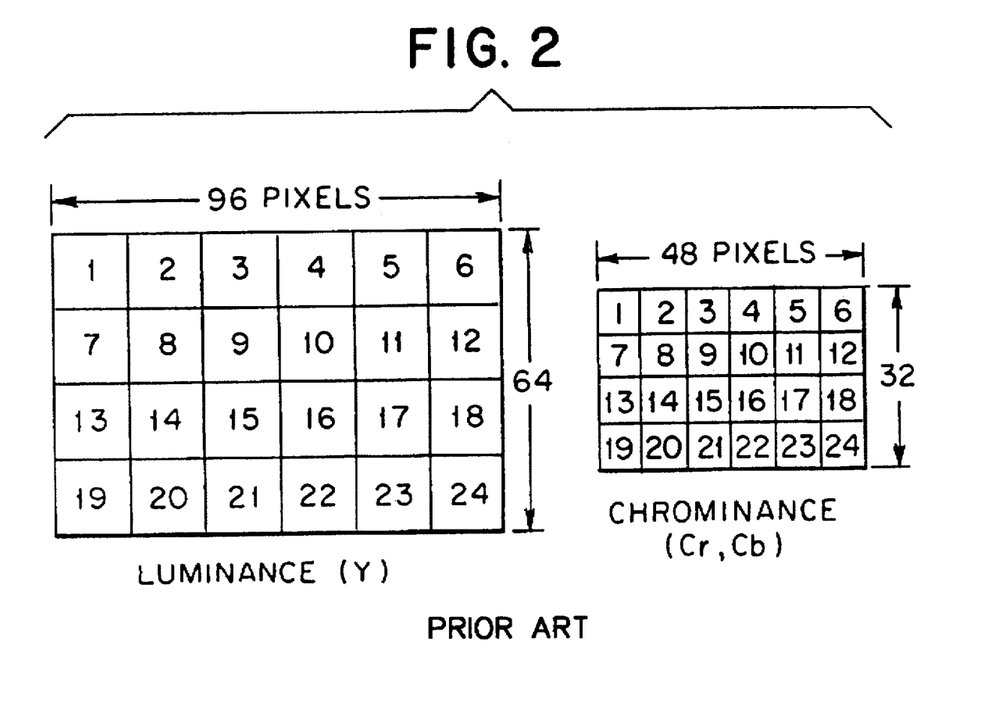
FIG. 2 shows an exemplary macroblock (MB) subdivision of a picture (for 4:2:0 format)

The third or "Picture" layer is a single picture. An illustration of a "macroblock" subdivision of a picture is shown in FIG. 2. The luminance component of each picture is subdivided into 16×16 regions; the color difference components are subdivided into appropriately sized blocks spatially co-sited with the 16×16 luminance regions; for 4:4:4 video, the color difference components are 16×16, for 4:2:2 video, the color difference components are 8×16, and for 4:2:0 video, the color difference components are 8×8. Taken together, these co-sited luminance region and color difference regions make up the fifth layer, known as "macroblock" (MB). Macroblocks in a picture are numbered consecutively in raster scan order.

Figure 3:
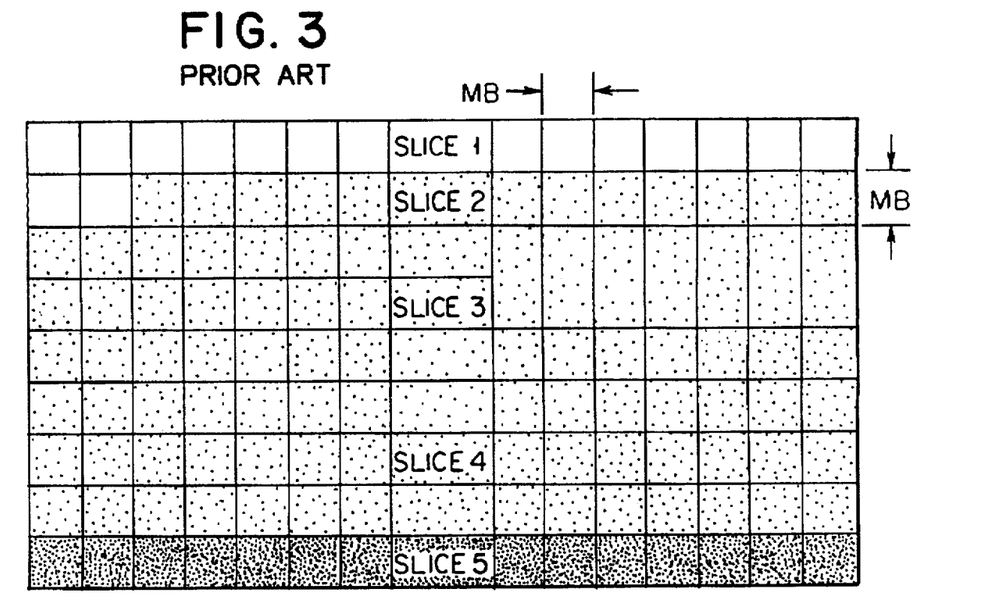
FIG. 3 shows an exemplary slice subdivision of a picture.

Between the Picture and MB layers is the fourth or "Slice" layer. Each slice consists of some number of consecutive MB's. Slices need not be uniform in size within a picture or from picture to picture. An example of a slice subdivision of a picture is shown in FIG. 3.

Finally, each MB consists of four 8×8 luminance blocks and 8, 4, or 2 (for 4:4:4, 4:2:2 and 4:2:0 video) chrominance blocks. If the width of each luminance picture (in picture elements or pixels) is denoted as C and the height as R (C is for columns, R is for rows), a picture is C/16 MB's wide and R/16 MB's high.

The Sequence, GOP, Picture, and Slice layers all have headers associated with them. The headers begin with byte-aligned "Start Codes" and contain information pertinent to the data contained in the corresponding layer.

A picture can be either a field-structured or frame-structured. A frame-structured picture contains information to reconstruct an entire frame, i.e., two fields, of data. A field-structured picture contains information to reconstruct one field. If the width of each luminance frame (in picture elements or pixels) is denoted as C and the height as R (C is for columns, R is for rows), a frame-structured picture contains information for C×R pixels and a field-structured picture contains information for C×R/2 pixels.

Figure 4:
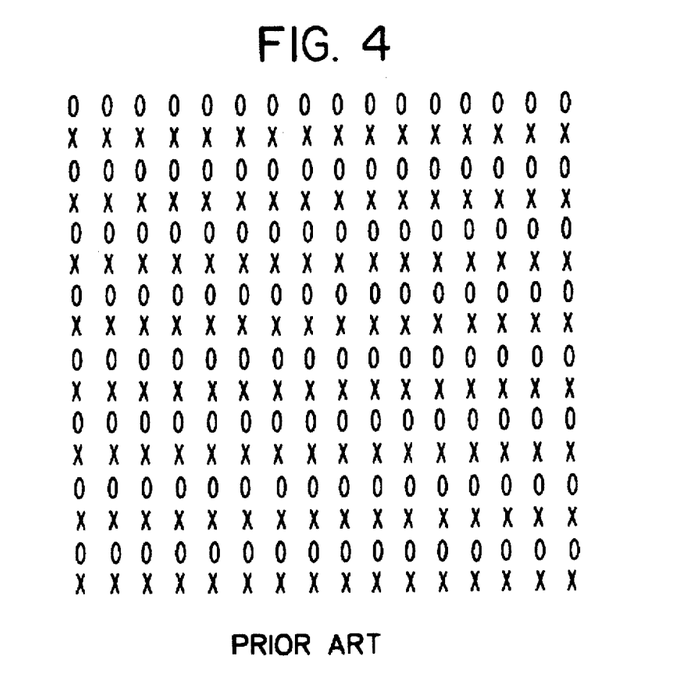
FIG. 4 shows a macroblock format in frame-structured interlaced picture.

A macroblock in a field-structured picture contains a 16×16 pixel segment from a single field. A macroblock in a frame-structured non-interlaced picture contains a 16×16 pixel segment from a non-interlaced frame. A macroblock in a frame-structured interlaced picture contains a 16×16 pixel segment from the frame that both fields compose; each macroblock contains a 16×8 region from each of two fields. An illustration of a macroblock in a frame-structured interlaced picture is shown in FIG. 4. Each "X" or "O" in FIG. 4 represents a single pixel. The Os represent pixels from the top field and the Xs represent pixels from the bottom field.

Each frame in an MPEG-2 sequence must consist of two coded field pictures or one coded frame picture. It is illegal, for example, to code two frames as one field-structured picture followed by one frame-structured picture followed by one field-structured picture; the legal combinations are: two frame-structured pictures, four field-structured pictures, two field-structured pictures followed by one frame-structured picture, or one frame-structured picture followed by two field-structured pictures. Therefore, while there is no frame header in the MPEG-2 syntax, conceptually one can think of a frame layer in MPEG-2.

Within a GOP, three "types" of pictures can appear. The distinguishing feature among the picture types is the compression method used. The first type, Intramode pictures or I-pictures, are compressed independently of any other picture. Although there is no fixed upper bound on the distance between I-pictures, it is expected that they will be interspersed frequently throughout a sequence to facilitate random access and other special modes of operation. Predictively motion-compensated pictures (P- pictures) are reconstructed from the compressed data in that picture and two most recently reconstructed fields from previously displayed I or P pictures. Bidirectionally motion-compensated pictures (B-pictures) are reconstructed from the compressed data in that picture plus two reconstructed fields from previously displayed I or P pictures and two reconstructed fields from I or P pictures that will be displayed in the future. Because reconstructed I or P pictures can be used to reconstruct other pictures, they are called anchor pictures. For purposes of this specification, an anchor picture is referred to as a terminal picture if the next anchor picture is an I-picture.

One very useful image compression technique is transform coding. In MPEG and several other compression standards, the discrete cosine transform (DCT) is the transform of choice. The compression of an I-picture is achieved by the steps of 1) taking the DCT of blocks of pixels, 2) quantising the DCT coefficients, and 3) Huffman coding the result. In MPEG, the DCT operation converts a block of 8×8 pixels into an 8×8 set of transform coefficients. The DCT transformation by itself is a lossless operation, which can be inverted to within the precision of the computing device and the algorithm with which it is performed.

The second step, quantisation of the DCT coefficients, is the primary source of lossiness in the MPEG standards. Denoting the elements of the two-dimensional array of DCT coefficients by $C_{mn}$, where m and n can range from 0 to 7, aside from truncation or rounding corrections, quantisation is achieved by dividing each DCT coefficient $C_{mn}$ by $w_{mn}$ X QP, with $w_{mn}$ being a weighting factor and QP being the macroblock quantiser. The weighting factor $w_{mn}$ allows coarser quantisation to be applied to the less visually significant coefficients.

Following quantisation, the DCT coefficient information for each MB is organized and coded, using a set of Huffman codes. As the details of this step are not essential to an understanding of the invention and are generally understood in the art, no further description will be offered here.

Most video sequences exhibit a high degree of correlation between consecutive pictures. A useful method to remove this redundancy prior to coding a picture is "motion compensation".

Motion compensation can be described as follows. For each macroblock, one or more motion vectors are encoded in the bit stream. These motion vectors allow the decoder to reconstruct a macroblock, called the predictive macroblock, from data in anchor pictures. The encoder subtracts the predictive macroblock from the macroblock to be encoded to form the difference macroblock. The encoder uses tools to compress the difference macroblock that are essentially similar to the tools used to compress an intra macroblock.

In P pictures, motion compensation is used to construct the predictive macroblock from anchor pictures that occur at an earlier time than the current picture. In B pictures, motion compensation is used to construct the predictive macroblock from anchor pictures that occur at an earlier time and later in time than the current picture.

The MPEG-2 compression method can be used with fixed bit-rate or variable bit-rate transmission or storage media. While for variable bit rate transmission the encoder has more freedom to determine how many bits to use in each macroblock (or each picture) the encoder still does not have complete freedom; it is restricted by the peak bit rate of the transmission or storage medium and the size of the decoder buffer.

Whether MPEG-2 is being used with fixed bit-rate or variable bit-rate transmission or storage media, the encoder does not have to use the same number of bits in every macroblock or even in every picture. The encoder gets this freedom by means of a buffer placed before the input to the decoder. The storage or transmission media fills the decoder buffer, but the decoder can empty its buffer at essentially an arbitrarily fast rate.

While the encoder need not use the same number of bits for each macroblock or for each picture, it still faces restrictions on the number of bits that may be produced. The MPEG-2 standard gives the details of these restrictions. For example, in the fixed-bit rate case the average bit rate of the encoder over long periods of time can only vary from the bit rate of the channel by a small amount, or else the decoder buffer will overflow or underflow.

As noted, setting QP for each macroblock is the primary means by which the encoder trades off quality versus bit rate production in MPEG-2. This is true both on the sequence level and on the macroblock level: if all of the values of QP in a sequence are increased or decreased, then the quality and bit rate of the sequence will be, respectively, increased or decreased. If QP is increased or decreased for a single MB, then the quality and number of bits used for that macroblock will be, respectively, increased or decreased.

Some regions of a picture will be more "sensitive" to quantisation noise than other regions. That is, the distortion caused by using a large value of QP will be more noticeable in some regions of the image than in others. Thus an encoder may try to use a large value of QP in regions of the picture where this will not cause severe perceptual degradation and smaller values for QP in regions of the picture that are more sensitive to quantisation noise. This process, known as adaptive quantisation, is not a subject of the MPEG standards. Thus, two encoders may use completely different apparatuses or methods for adaptive quantisation and still each produce valid bit streams. However, the quality of the pictures decoded from the bit stream produced by an encoder will depend on the adaptive quantisation unit. Moreover, different adaptive quantisation may have different implementation costs.

b. Embodiment

Figure 15:
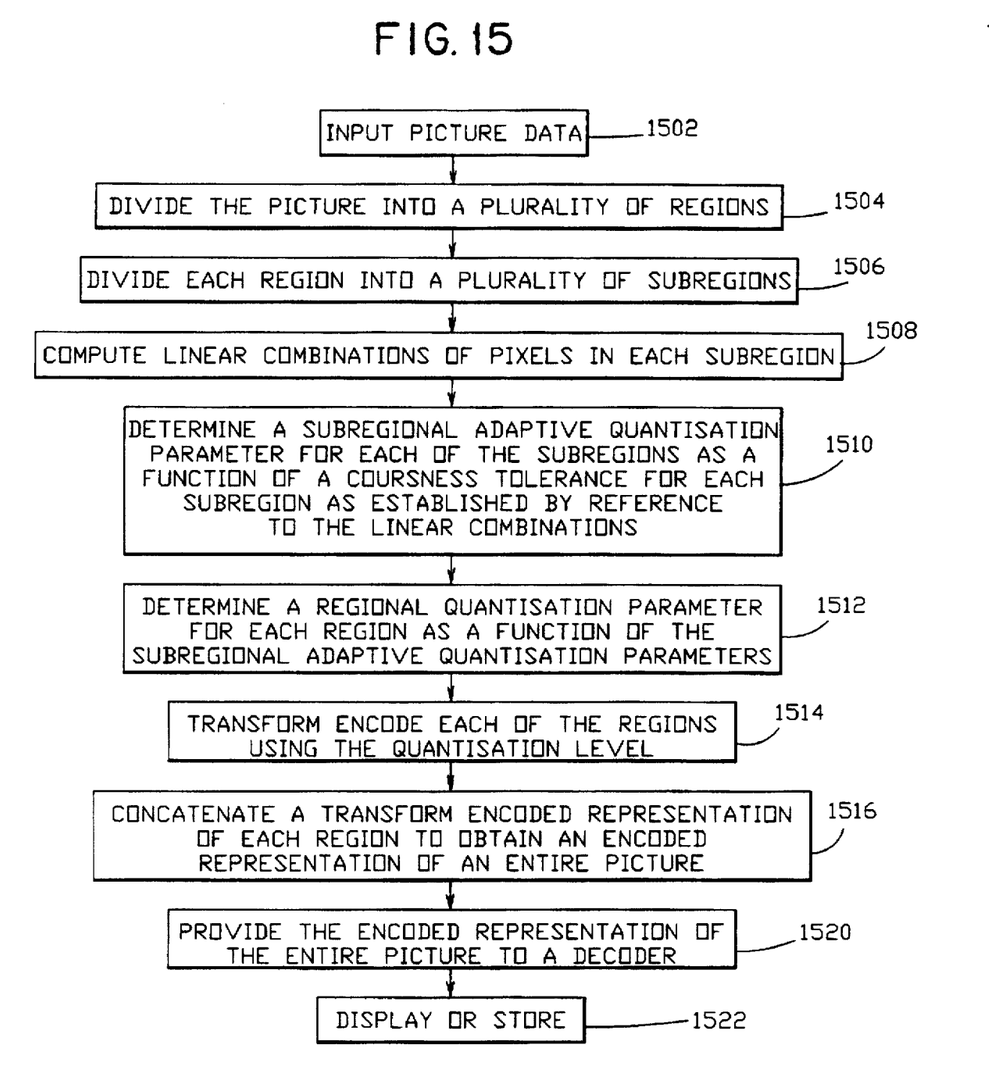
FIG. 15 is an overview of a coding method in accordance with the principles of the present invention.

An overview of a coding method in accordance with the principles of the present invention will first be described by reference to FIG. 15.

In step 1502 a digitized picture is input to the encoder. In step 1504 the encoder divides the picture into a plurality of regions and then in step 1506 divides each region into a plurality of subregions. In step 1508 the encoder computes linear combinations of pixels in each subregion. In step 1510, the encoder determines a subregional adaptive quantisation parameter for each of the subregions as a function of the linear combinations. The function establishes a courseness tolerance for each subregion.

In step 1512, the encoder determines a regional quantisation parameter for each region as a function of the subregional adaptive quantisation parameters and then in step 1514 determines a quantisation level for each of the regions based on the regional quantisation parameter.

Once the regional quantisation level for a region has been determined, it is transform encoded in step 1516. For a still picture, the pixel data itself is transform encoded. For a moving picture encoded with motion compensation, the motion compensation difference signal is transform encoded.

In step 1518 the transform encoded representations of the regions are concatenated to obtain an encoded representation of the entire picture. The encoded representation of the entire picture is decoded in step 1520 and then displayed or stored in step 1522.

Figure 5:
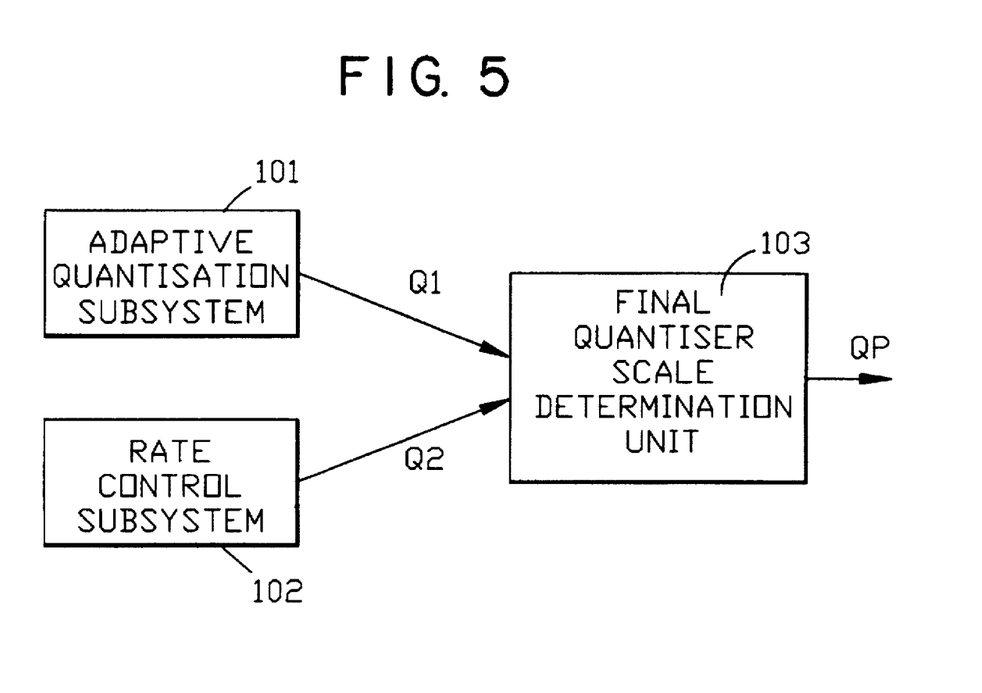
FIG. 5 is a block diagram of a conventional quantiser scale generation subsystem.

One of the tasks that an encoder performs is to set QP for each MB. A conventional apparatus for setting QP is shown in FIG. 5. The adaptive quantisation unit 101 produces a signal Q1 for each macroblock. This signal describes how sensitive the macroblock is to quantisation noise. The rate control unit 102 produces a signal Q2 that describes the overall quantisation level that must be used to hit the target bit rate (or not exceed some maximum bit rate). The final quantiser scale determination unit 103 combines these two numbers to generate the value for QP that will be used in each macroblock.

Figure 6:
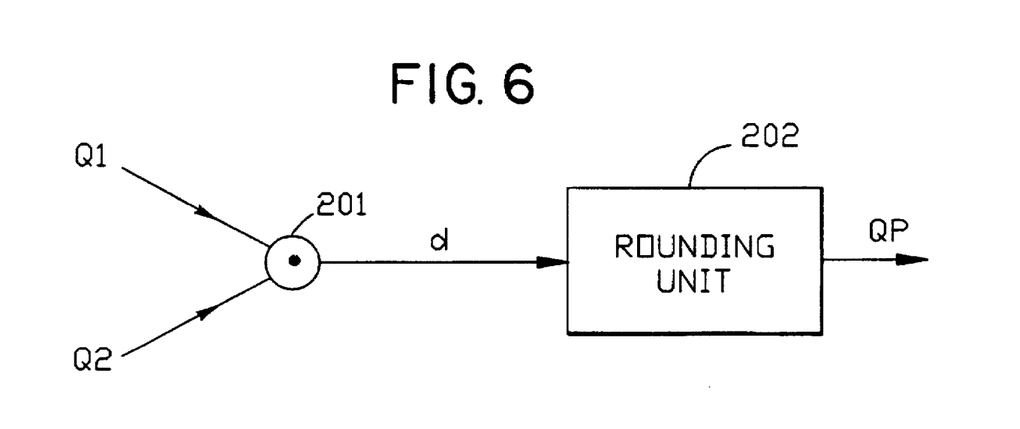
FIG. 6 is a block diagram of a conventional final quantiser scale determination unit.

The final quantiser scale determination unit shown in FIG. 6 has two inputs, Q1 and Q2. These are sent to a multiplier 201 which produces an output d equal to the product of Q1 and Q2. The rounding unit 202 produces an output QP which is the legal value for QP that is closest to d.

Figure 7:
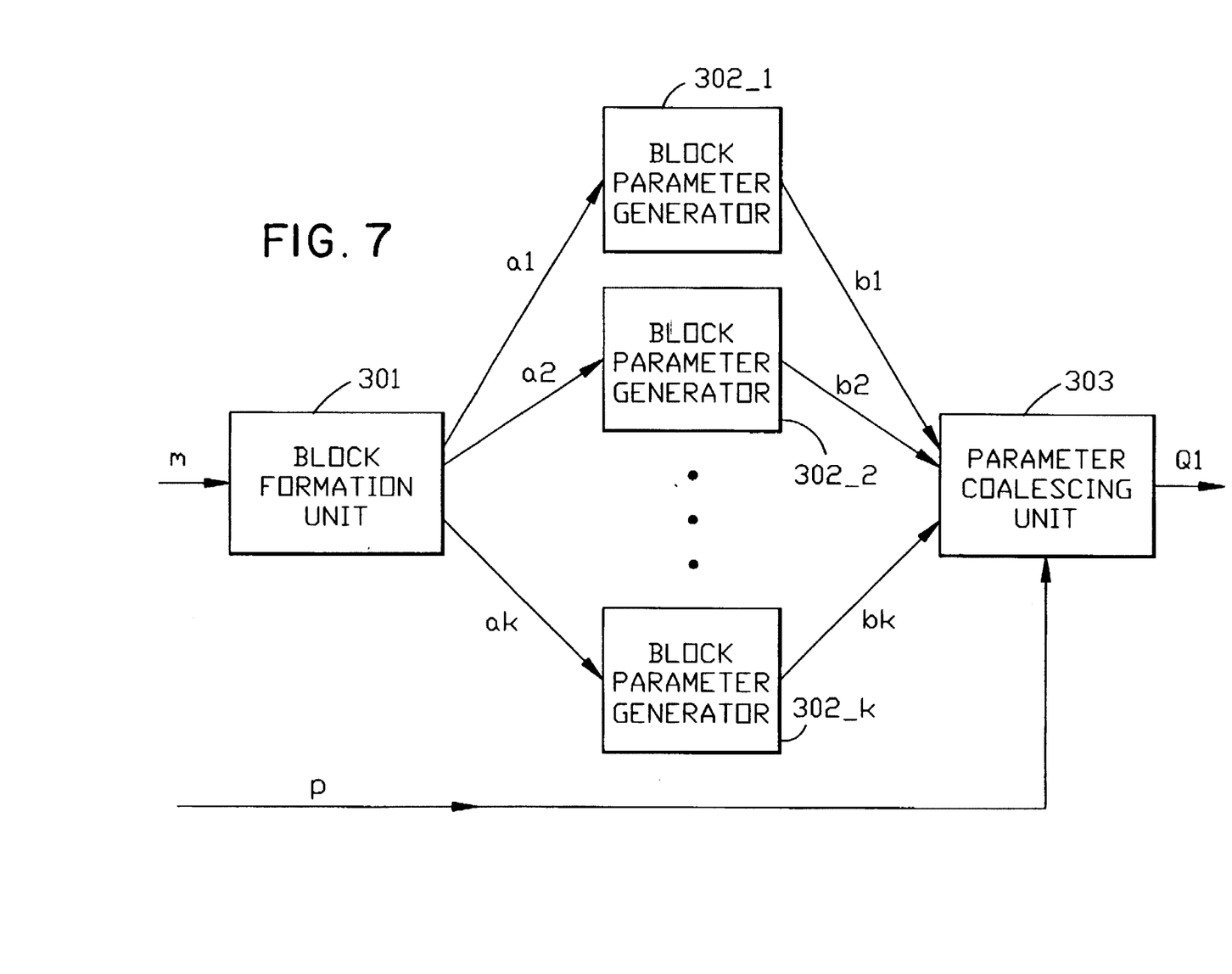
FIG. 7 shows a conventional adaptive quantisation subsystem.

FIG. 7 is an overview of a conventional adaptive quantisation subsystem suitable for application of the present invention. There are two input signals and one output signal to the adaptive quantisation subsystem. The inputs are the luminance macroblock pel values, m, and a parameter set, p. The output is the perceptual quantiser, Q1. The luminance macroblock pel values are sent to a block formation unit 301. The block formation unit forms K blocks of pixels, which are shown as signals a1, a2, . . . ak. Each of these signals contains a (not necessarily proper) subset of the luminance macroblock pel values. The pixel blocks a1, a2, . . ak are sent to a set of block parameter generators 302__1, 302__2, . . . 302__K. For each MB, a block parameter generator receives one block of pels and generates a single number. These numbers are the signals b1, b2, . . . bk shown in FIG. 7. The block parameter generators, 302__1, 302__2, . . 302__K, produce, respectively, b1, b2, . . . bk. The signals b1, b2, . . . bk, as well as the parameter set p, are sent to a parameter coalescing unit 303. The parameter coalescing unit produces the perceptual quantiser Q1.

Figure 8:
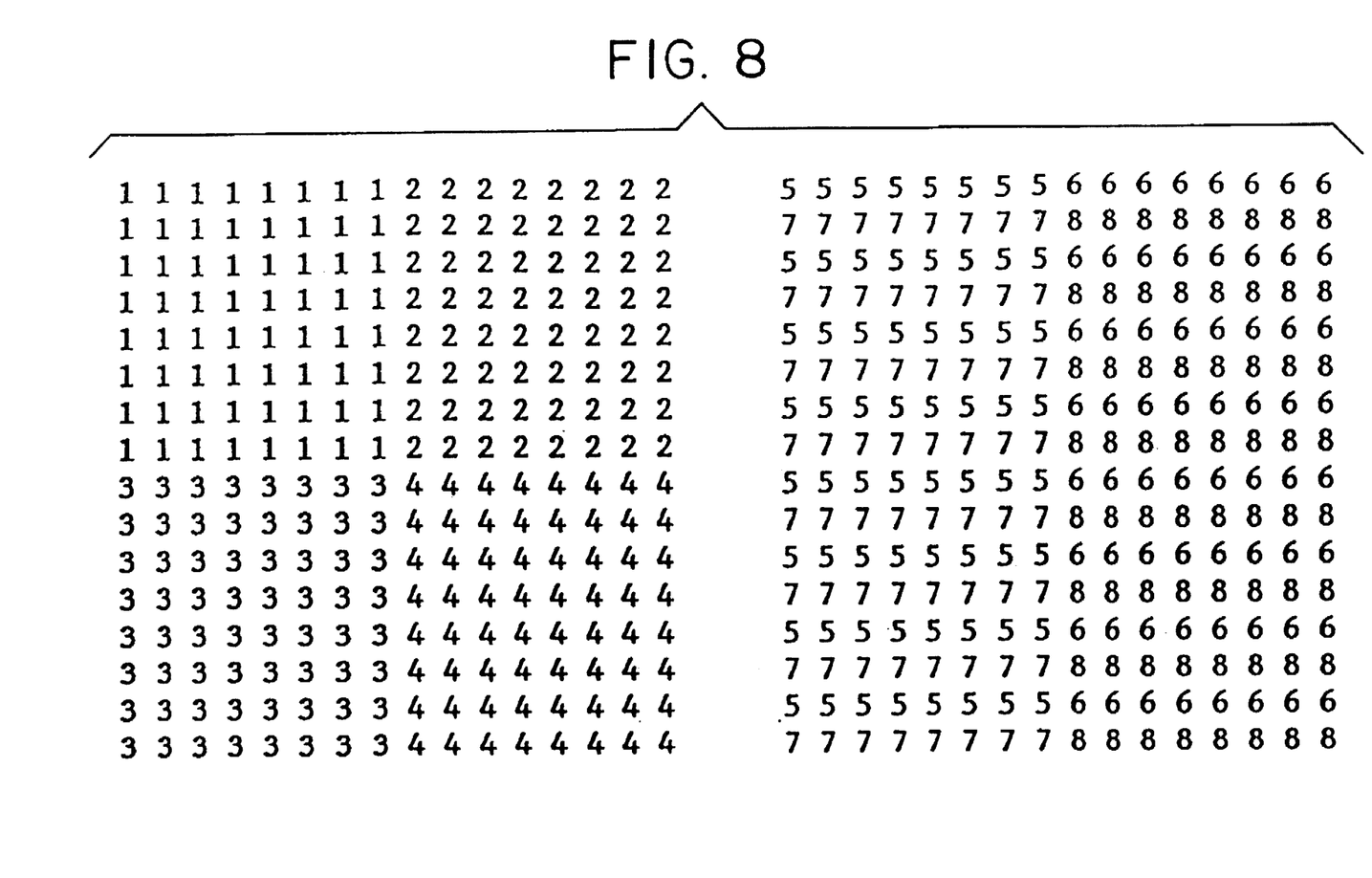
FIG. 8 shows block partitioning of a macroblock.

The operation of an embodiment of the block formation unit can be explained with the aid of FIG. 8. For this embodiment, the block formation unit forms eight subblocks. FIG. 8 has two representations of the luminance pixels in a MB. In each representation a pixel is represented by a number. The pixels labeled "1" go to subblock a1, the pixels labeled "2" go to subblock a2, etc. Note that the subblocks are overlapping.

This particular block formation unit is useful for macroblocks in frame-structured interlaced pictures. For field-structured or non-interlaced pictures, it is often better to use only subblocks a1, a2, a3 and a4. Although this embodiment uses subblock sizes of 8×8 pixels, other block sizes are possible.

Figure 9:
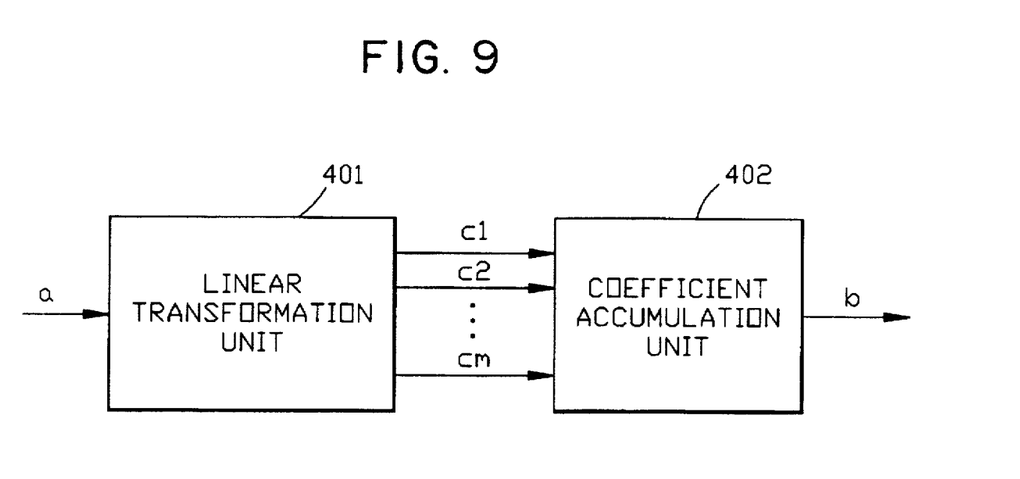
FIG. 9 is a block diagram of a block parameter generator according to an embodiment of the present invention.

In FIG. 9 shows an improved block parameter generation unit according to an embodiment of the present invention. A pixel subblock, a, is input into a linear transformation unit 401 (which will be described in more detail by reference to FIG. 10), which produces linear combinations (c1, c2, . . . cm) of the pixel values for each input subblock, a. The linear combinations c1, c2, . . . cm are fed to a coefficient accumulation unit 402 (which will be described in more detail by reference to FIG. 11), which computes a block adaptive quantisation parameter, b, from c1, c2, . . . cm.

Figure 10:
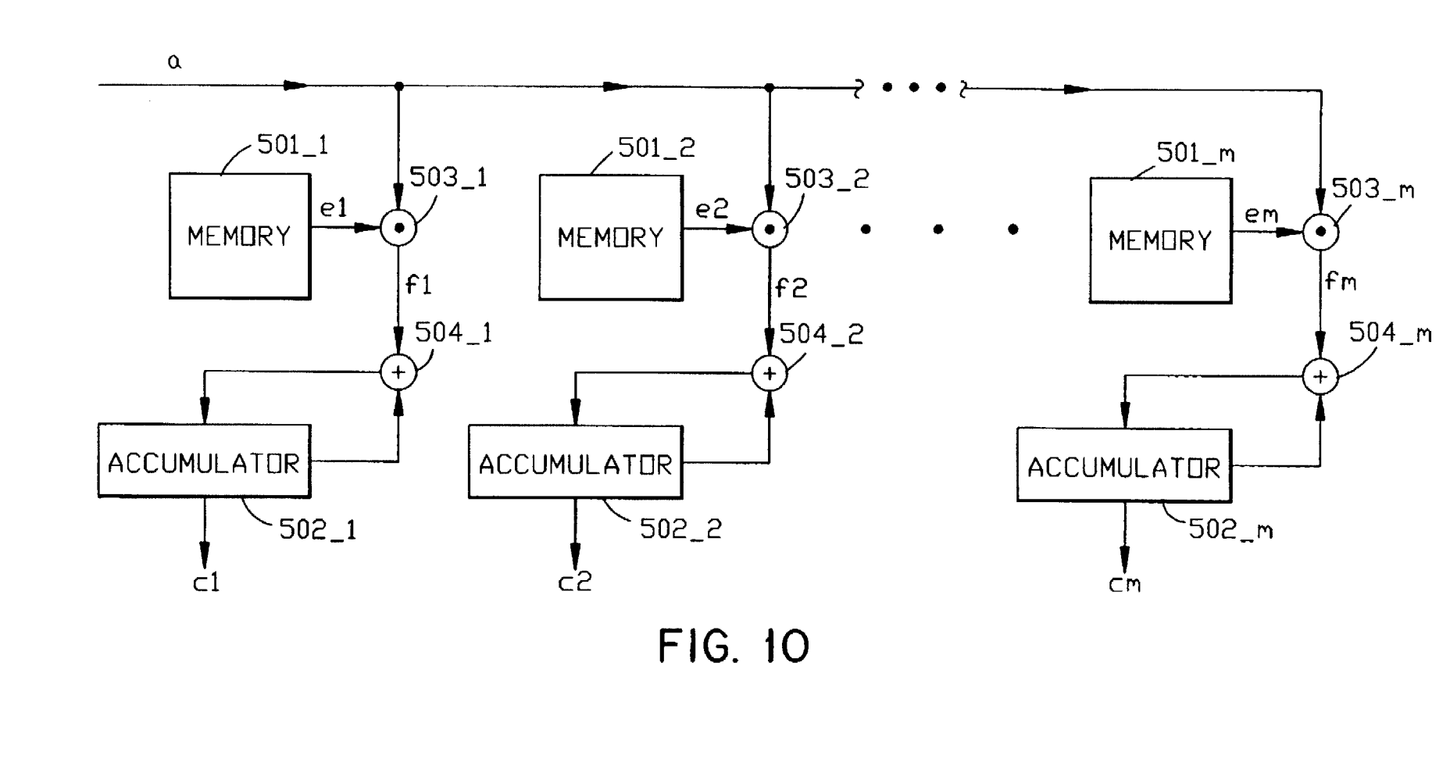
FIG. 10 is a more detailed diagram of the linear transform unit of FIG. 9.

FIG. 10 is a more detailed diagram of the linear transform unit 401. This unit has m memory units 501__1, 501__2, . . . 501__m. Each memory unit contains one transformation coefficient for each pixel in the input block, a. There are m accumulators 502__1, 502__2, . . . 502__m in the linear transform unit. The number m of memory units and accumulators can be chosen, for example, as being equal to the number of pixels in a subblock (which is 64 in the current embodiment). Each accumulator is initialized to zero before a subblock is read in.

When the first element of the subblock is read in, the memory units 501__1, 501__2, . . . send the first transformation coefficient from their respective memories, shown as the signals e1, e2, . . em, to be multiplied with the first pixel in the input block using the multipliers 503__1, 503__2, . . . 503__m. The results of the multiplications are the signals f1, f2, . . . fm. These signals are added, by adders 504__1, 504__2, . . . 504__m, respectively, to the contents of the accumulators 502__1, 502__2, . . . 502__m, and the results are stored back in the respective accumulators. When the second element of the subblock is read in, the memory units 501__1, 501__2, . . . send the second transformation coefficients from their respective memories to be multiplied with the second pixel in the input subblock. These products are added, respectively, to the contents of the accumulators 502__1, 502__2, . . . 502__m, and the results are stored back in the respective accumulators. The process is continued until the entire block is read in. Then, the accumulators hold the output signals c1, c2, . . . cm.

Figure 11:
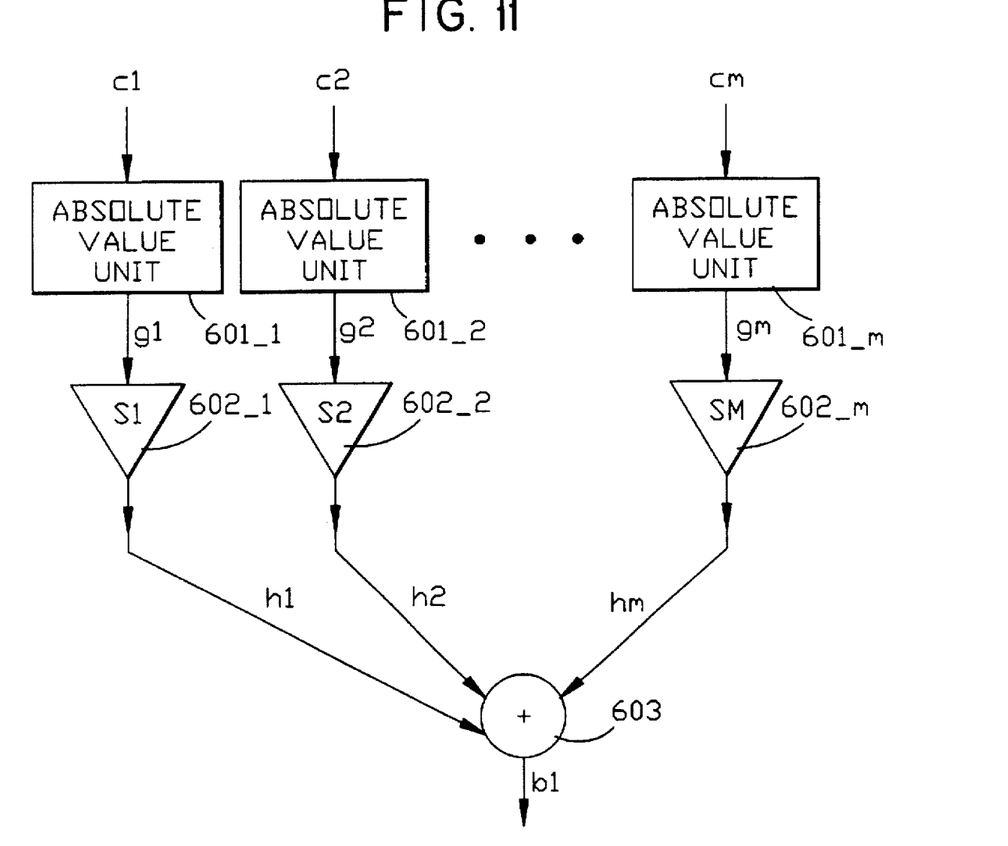
FIG. 11 is a more detailed diagram of the coefficient accumulation unit of FIG. 9.

The coefficient accumulation unit is shown in more detail in FIG. 11. The input signals c1, c2, . . . cm are each fed, respectively, into the absolute value units, 601__1, 601__2, . . . 602__m, which produce signals g1, g2, . . . gm, with gi equal to the absolute value of ci for all i. The signal g1, g2, . . . gm are then fed into a series of scalars 602__1, 602__2, . . . 602__m. These scalars compute, respectively, h1, h2, . . . hm, with hi equal to the product of gi and Si for all i, where Si are constant scalars.

The signals h1, h2, . . . hm are summed up in an adder 603, and the result is the output b.

Figure 12:
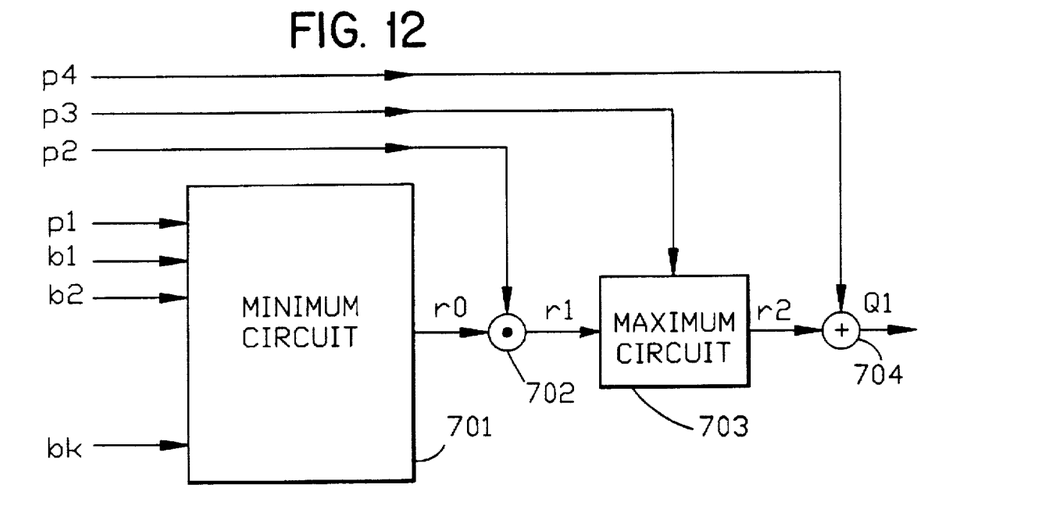
FIG. 12 is a diagram of a parameter coalescing unit according to an embodiment of the present invention.

An improved parameter coalescing unit according to an embodiment of the present invention is shown in detail FIG. 12. The inputs to this parameter coalescing unit are b1, b2, . . . bk and p1, p2, p3, p4. For this embodiment of the parameter coalescing unit, p1, p2, p3 and p4 constitute the parameter set p in FIG. 7. The parameter p1 and b1, b2, . . . bk are sent to a minimum circuit 701, which produces an output r0 which is equal to the minimum of p1 and b1, b2, . . . bk. The signal r0 is then multiplied by the parameter p2 in the multiplier 702, and the result is r1=p2×r0. The maximum circuit 703 computes r2, which is the larger of r1 and p3. The adder 704 computes Q1=r2+p4. Q1 is the macroblock adaptive quantisation parameter.

Figure 13:
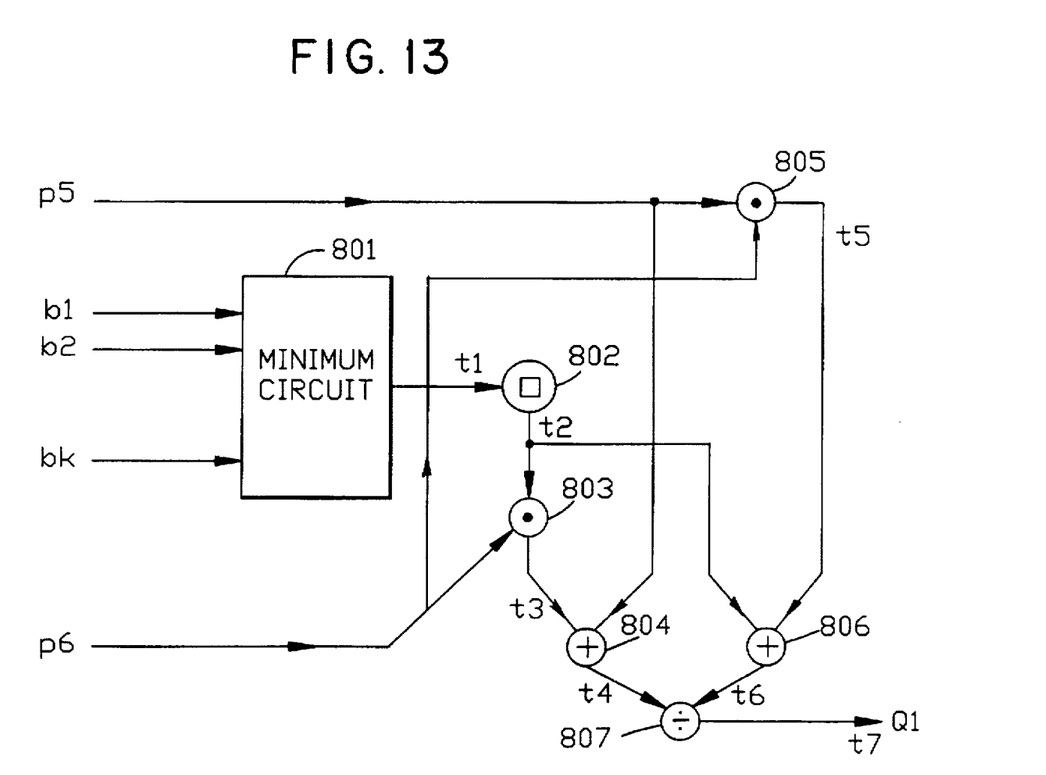
FIG. 13 is a diagram of an alternate parameter coalescing unit according to another embodiment of the present invention.

An alternate parameter coalescing unit according to another embodiment of the present invention is shown in FIG. 13. The inputs to this parameter coalescing unit are b1, b2, . . . bk and p5 and p6. For this embodiment of the parameter coalescing unit, p5, and p6 constitute the parameter set p in FIG. 7. The signals b1, b2, . . . bk are sent to a minimum circuit 801, which produces an output t1 which is equal to the minimum of b1, b2, . . . bk. The signal t1 is sent to squaring unit 802, which produces an output t2=t1×t1. The multiplier 803 computes t3 as t3=t2×p6. The adder 804 computes t4 as t4=t3+p5. The multiplier 805 computes t5 as t5=p5×p6. (Note that if p5 and p6 are the same for each MB, then t5 need not be recomputed for each MB.) The adder 806 computes t6 as t6=t5+t2. The division circuit 807 computes Q1 as Q1=t4/t6.

The operation of the of the adaptive quantisation subsystem described above depends on the parameter set p, the multipliers S1, S2, ... Sm and the contents of the memory devices 501_1, 501_2,...501_m in FIG. 10. We now give two examples of how the memory of contents of the memories can be set. The first is the difference from mean (DFM) method, and the second is the Hadamard (HAD) method. Denote by n the number of elements in a block of pixels produced by the block formation unit 301 in FIG. 7. For both the DFM and HAD methods, m, the number of outputs of a linear transformation unit (FIG. 10), is equal to n.

For the DFM method, the jth transformation coefficient in memory element i is equal to $-1/n$ if i is not equal to j, and $1-(1/n)$ if j is equal to i.

Figure 14:
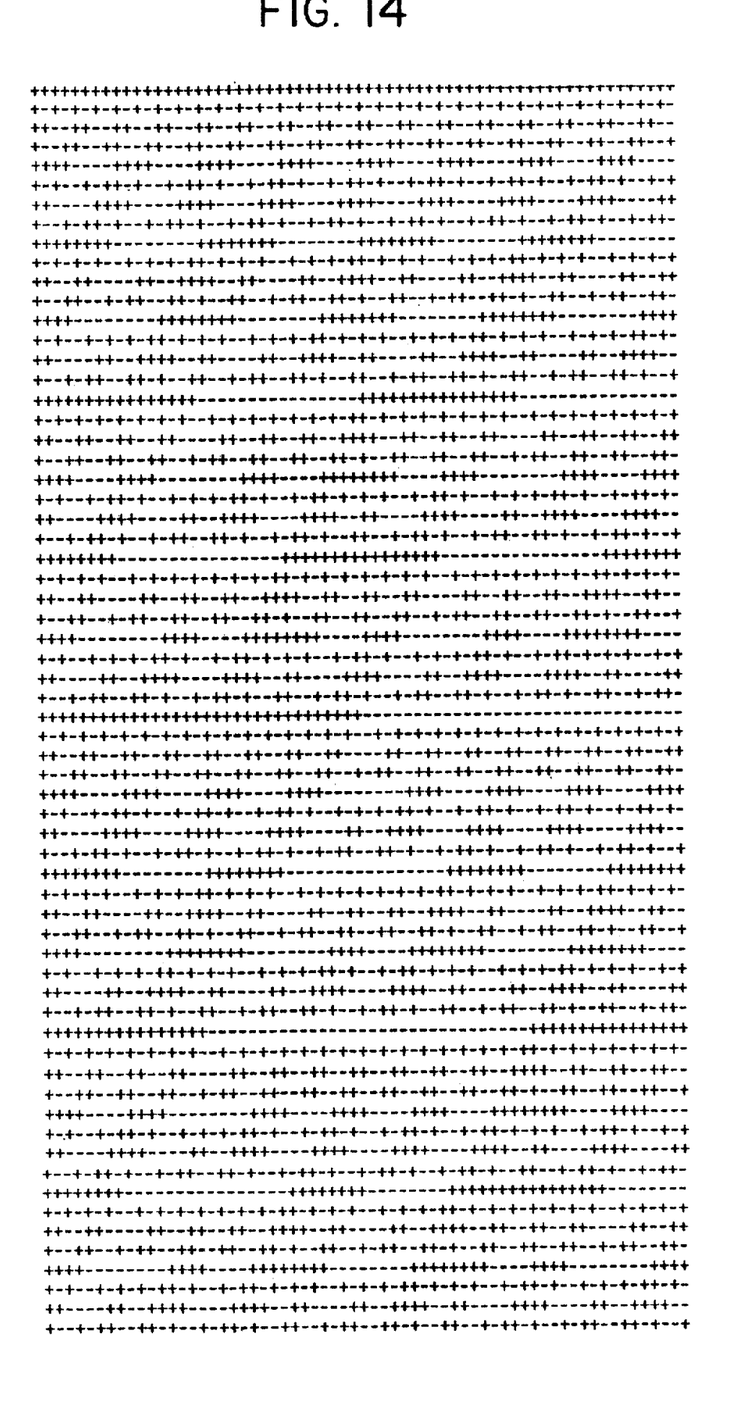
FIG. 14 is a pictorial representation of a Hadamard transform.

For the HAD method, the linear transformation unit computes a Hadamard transform on the input block of pixels. The Hadamard transformation is conventional and is described, for example in "Digital Image Processing" by C. Gonzalez and P. Wintz, second addition, 1987; section 3.5.2. For the case when n=64 (as it does in the embodiment of the block formation unit described above), we have a pictorial representation of the HAD method in FIG. 14. In FIG. 14, we have a two dimensional array of "+" symbols and "−" symbols. Each row of the array represents a memory device in FIG. 10, and each column represents an entry number in the memory devices. The jth number in memory element i is equal to +1 if the jth symbol in the ith row of the matrix in FIG. 10 is a "+", and it is equal to −1 if the jth symbol in the ith row of the matrix in FIG. 10 is a "−".

It should be understood that the above described systems and methods can be embodied in hardware logic or as program code in a computing system.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method for coding a digital picture, comprising the steps of:

dividing the picture into a plurality of regions;

dividing each region into a plurality of subregions;

determining linear combinations of pixels in each subregion, each of said linear combinations representing an accumulation of values related to a plurality of pixels of said subregion;

determining a subregional adaptive quantization parameter for each of the subregions as a function of the linear combinations, the function establishing coarseness tolerance for each subregion;

determining a regional quantization parameter for each region as a function of the subregional adaptive quantization parameters;

determining a quantization level for each of the regions based on the regional quantization parameter;

transform encoding each of the regions using the quantization level; and concatenating a transform encoded representation of each region to obtain an encoded representation of an entire picture.

2. The method of claim 1, comprising the further steps of:

providing the encoded representation of the entire picture to a decoder; and displaying the entire picture, in decoded form, on a display device.

3. The method of claim 1, wherein the linear combinations are computed by performing a Hadamard transformation on pixels values in each subregion.

4. An encoder for encoding a digital picture data, comprising:

means for dividing the picture into a plurality of regions;

means for dividing each region into a plurality of subregions;

means for computing linear combinations of pixels in each subregion, each of said linear combinations representing an accumulation of values related to a plurality of pixels of said subregion;

means for determining a subregional adaptive quantization parameter for each of the subregions as a function of the linear combinations, the function establishing coarseness tolerance for each subregion;

means for determining a regional quantization parameter for each region as a function of the subregional adaptive quantization parameters;

means for determining a quantization level for each of the regions based on the regional quantization parameter;

means for transform encoding each of the regions using the quantization level; and means for concatenating a transform encoded representation of each region to obtain an encoded representation of an entire picture.

5. The method of claim 1, wherein said determining linear combinations comprises for each linear combination:

multiplying a plurality of pixel values by a plurality of coefficients obtaining a plurality of results;

adding said plurality of results to obtain therefrom a linear combination of pixels.

6. The encoder of claim 4, wherein said means for computing linear combinations comprises for each linear combination:

means for multiplying a plurality of pixel values by a plurality of coefficients obtaining a plurality of results; and means for adding said plurality of results to obtain therefrom a linear combination of pixels.

* * * * *